US011993485B2

(12) United States Patent
Xu et al.

(10) Patent No.: US 11,993,485 B2
(45) Date of Patent: May 28, 2024

(54) LIFTING DEVICE FOR BUILDING STEEL STRUCTURE HOISTWAY AND METHOD FOR BUILDING STEEL STRUCTURE HOISTWAY

(71) Applicant: Otis Elevator Company, Farmington, CT (US)

(72) Inventors: Hualiang Xu, Hangzhou (CN); Fei Chen, Hangzhou (CN); Gangliang Chen, Hangzhou (CN); Zheng Lu, Hangzhou (CN); Huaping Sun, Hangzhou (CN); Yanchong Wang, Hangzhou (CN); Yijin Luo, Hangzhou (CN); Zhijun Shen, Hangzhou (CN); Lili Yang, Hangzhou (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/981,048

(22) Filed: Nov. 4, 2022

(65) Prior Publication Data

US 2024/0067503 A1 Feb. 29, 2024

(30) Foreign Application Priority Data

Aug. 24, 2022 (CN) ......................... 202211017639.1

(51) Int. Cl.
*B66B 19/00* (2006.01)
*B66C 23/30* (2006.01)

(52) U.S. Cl.
CPC .............. *B66B 19/00* (2013.01); *B66C 23/30* (2013.01)

(58) Field of Classification Search
CPC ....... B66C 23/30; B66C 23/305; B66C 23/32; B66B 19/00; E04G 3/32; E04G 2003/286
See application file for complete search history.

(56) References Cited

U.S. PATENT DOCUMENTS 1,023,507 A * 4/1912 Davison .................. B66C 23/10 212/256
3,485,384 A * 12/1969 Yu ........................... B66C 23/32 212/270

(Continued)

FOREIGN PATENT DOCUMENTS

CN 112482733 A 6/2019
CN 208996441 U 6/2019

OTHER PUBLICATIONS

European Search Report for Application No. 22207904.8, dated Sep. 7, 2023, 6 Pages.

*Primary Examiner* — Michael R Mansen
*Assistant Examiner* — Juan J Campos, Jr.
(74) *Attorney, Agent, or Firm* — CANTOR COLBURN LLP

(57) ABSTRACT

A lifting device for building a steel structure hoistway and a method for building a steel structure hoistway. The lifting device includes a lifting mechanism and a crane mechanism. The lifting mechanism includes a bottom platform, a middle platform and a top platform. The crane mechanism is arranged on the top platform of the lifting mechanism, and includes a base and a crane on the base. The base is arranged on the top platform and is rotatable relative to the top platform along a vertical axis, and the hanger frame of the crane is movable between a vertical orientation and an inclined orientation. The lifting mechanism is configured to ascend and descend in the constructed steel structure hoistway, and the crane mechanism is configured to lift building materials, such as steel beams, steel columns, etc., for use in building the steel structure hoistway to their designed installation locations.

16 Claims, 7 Drawing Sheets

(56) References Cited

U.S. PATENT DOCUMENTS

| | | | | |
|---|---|---|---|---|
| 3,539,053 | A * | 11/1970 | Hefferin | F16D 55/228 192/225 |
| 3,998,029 | A * | 12/1976 | James | B66C 23/32 212/176 |
| 4,183,440 | A * | 1/1980 | Wilkinson | B66C 23/701 212/231 |
| 4,298,128 | A * | 11/1981 | Gattu | B66C 23/706 212/230 |
| 9,169,107 | B2 * | 10/2015 | Wilts | E04G 3/28 |
| 11,724,919 | B2 * | 8/2023 | Kalanj | B66C 23/283 212/294 |
| 2002/0134745 | A1 * | 9/2002 | Jurimae | B66C 23/32 212/179 |
| 2013/0087679 | A1 * | 4/2013 | Mooney | F16M 11/24 414/800 |
| 2015/0107186 | A1 * | 4/2015 | Wilts | B66B 19/002 52/741.1 |
| 2021/0292134 | A1 * | 9/2021 | Kalanj | B66C 23/32 |
| 2022/0185631 | A1 | 6/2022 | Lanz et al. | |

* cited by examiner

LIFTING DEVICE FOR BUILDING STEEL STRUCTURE HOISTWAY AND METHOD FOR BUILDING STEEL STRUCTURE HOISTWAY

FOREIGN PRIORITY

This application claims priority to Chinese Patent Application No. 202211017639.1, filed Aug. 24, 2022, and all the benefits accruing therefrom under 35 U.S.C. § 119, the contents of which in its entirety are herein incorporated by reference.

FIELD OF THE INVENTION

The present invention relates to the field of elevator hoistway construction, and in particular to the device and method for building steel structure hoistways in the renovation of old residential areas by adding elevators thereto.

BACKGROUND OF THE INVENTION

Nowadays, the demand for adding elevators in the renovation of old residential areas is increasing day by day. When adding elevators to a building, it is necessary to build an additional hoistway in the exterior zone of the building. For the common six-story residential area, some schemes propose to use two pre-built three-story steel structure hoistways to form a six-story hoistway. Such a scheme requires large mechanical equipment to enter the community. However, for most old communities, the roads are usually narrow, so it is difficult for large mechanical equipment to enter, and it is relatively difficult to transport and assemble the three-story steel structure hoistways.

SUMMARY OF THE INVENTION

The object of the present application is to solve or at least alleviate the problems existing in the prior art.

According to one aspect, a lifting device for building a steel structure hoistway is provided, which comprises: a lifting mechanism comprising: a bottom platform, a middle platform and a top platform, wherein the middle platform and the top platform each comprise telescopic brackets so as to be supported on cross beams of a constructed steel structure hoistway, the top platform is connected with the bottom platform by a plurality of columns, and the middle platform moves along the plurality of columns as driven by a driving device; and a crane mechanism arranged on the top platform of the lifting mechanism, the crane mechanism comprising a base and a crane on the base, wherein the base is arranged on the top platform and is rotatable relative to the top platform along a vertical axis, and a hanger frame of the crane is movable between a vertical orientation and an inclined orientation; wherein the lifting mechanism is configured to climb in the constructed steel structure hoistway, and the crane mechanism is configured to lift building materials, such as steel beams, steel columns, connecting pieces, etc., for used in building the steel structure hoistway to designed installation locations of the constructed steel structure hoistway, such as the top of the hoistway, for building higher levels of the hoistway.

Optionally, in an embodiment of the lifting device, the middle platform is movable between a first position close to the top platform and a second position close to the bottom platform. In the first position, the telescopic brackets of the middle platform and the top platform can be supported by the same pair of cross beams, wherein the ends of the telescopic bracket of the middle platform have hooks extending upward, and the ends of the telescopic bracket of the top platform have a straight configuration.

Optionally, in an embodiment of the lifting device, the plurality of columns comprise at least one screw rod and a plurality of guide columns, and the middle platform comprises a nut sleeved on the screw rod and bearings sleeved on the plurality of guide columns.

Optionally, in an embodiment of the lifting device, the driving device comprises a first motor and a first transmission mechanism. The first motor drives the at least one screw rod to rotate through the first transmission mechanism, and the first motor is arranged on the bottom platform or the top platform.

Optionally, in an embodiment of the lifting device, the bottom platform, the middle platform and the top platform are all substantially rectangular. The at least one screw rod is located in the middle of the bottom platform, the middle platform and the top platform, four guide columns are located at four corners of the bottom platform, the middle platform and the top platform, and the middle platform is sleeved on the respective guide columns through linear bearings.

Optionally, in an embodiment of the lifting device, the base of the crane mechanism is connected to the top surface of the top platform of the lifting mechanism through a rotary support bearing. A second motor is provided on the base. The second motor is meshed with the external teeth of the rotary support bearing through a second transmission mechanism, so as to drive the base of the crane mechanism to rotate, wherein the second transmission mechanism comprises a worm and gear mechanism and a pinion.

Optionally, in an embodiment of the lifting device, the crane comprises a hanger frame, wherein a first side of the hanger frame is pivotally connected to a first support on the base, a second side of the hanger frame is pivotally connected to a telescopic mechanism that is pivotally connected to a second support on the base, so that the hanger frame is movable between a vertical orientation and an inclined orientation at an inclined angle a of more than 15 degrees from the vertical direction, wherein the telescopic mechanism is a screw rod lifting device, and the crane can pass through the steel structure hoistway in the vertical orientation.

Optionally, in an embodiment of the lifting device, the base is further provided with a windlass, and the windlass is arranged on a platform above the second motor.

A method of building a steel structure hoistway is further provided, which comprises: building a fundamental steel structure hoistway on ground and placing a lifting device in the steel structure hoistway;

- bringing a top platform of the lifting device close to the top of a constructed steel structure hoistway; lifting, using a crane mechanism, building materials, such as steel beams, steel columns, etc., and using lifted building materials to build higher levels of the steel structure hoistway; and repeating the steps of having the lifting device to climb, lifting building materials using the crane mechanism, and building higher levels of the steel structure hoistway until a steel structure hoistway with a desired height is constructed.

Optionally, the method comprises: extending the telescopic brackets of the middle platform of the lifting device to be supported by cross beams of the $N^{th}$ story, and elevating the top platform to the $N+1^{th}$ story; lifting beams for construction of the steel structure hoistway to the $N+1^{th}$ story to build cross beams and longitudinal beams of the N+1$^{th}$ story; extending the telescopic brackets of the top platform to be supported by cross beams of the N+1$^{th}$ story, and retracting the telescopic brackets of the middle platform; bringing the middle platform to climb close to the top platform, and extending the telescopic brackets of the middle platform to be supported by the cross beams of the N+1$^{th}$ story; and retracting the telescopic brackets of the top platform, and bringing the top platform to climb to the N+2$^{th}$ story, where N can be any natural number.

Optionally, the method further comprises: orienting the crane of the crane mechanism vertically, lowering the lifting device to ground, detaching the crane and recovering the lifting device, after a steel structure hoistway of a desired height is constructed.

Optionally, the lifting device is the lifting device according to the various embodiments of the present invention.

The device and method according to the embodiments of the present invention realize the construction of elevator hoistways in absence of large mechanical equipment, and lower the requirements for environmental conditions (such as road, construction space, etc.) for building elevator hoistways.

BRIEF DESCRIPTION OF THE DRAWINGS

With reference to the accompanying drawings, the disclosure of the present application will become easier to understand. Those skilled in the art would readily appreciate that these drawings are for the purpose of illustration, and are not intended to limit the protection scope of the present application. In addition, in the figures, similar numerals are used to denote similar components, where.

DETAILED DESCRIPTION OF EMBODIMENT(S) OF THE INVENTION

Figure 1:
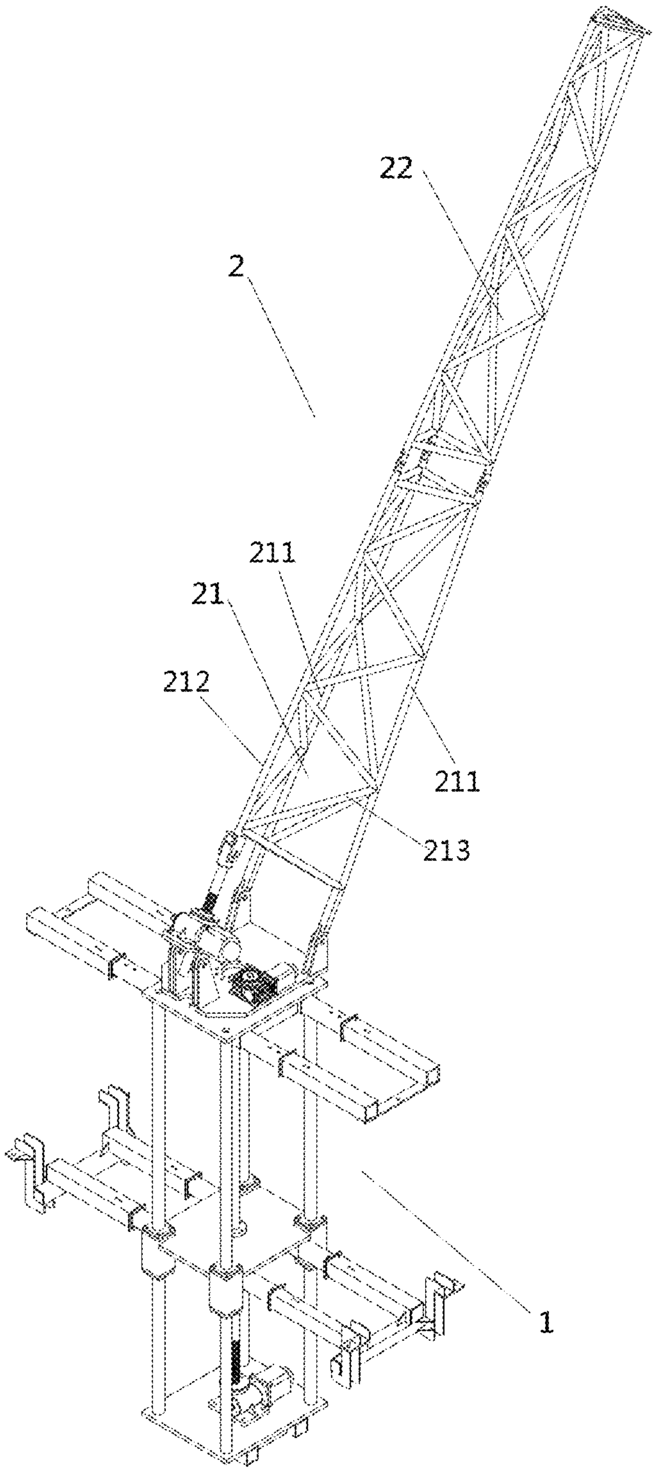
FIG. 1 is a perspective view of a lifting device according to an embodiment of the present invention.

The present application provides a lifting device for building a steel structure hoistway, which is compact in structure and is suitable for building a steel structure hoistway when an elevator is installed in an old residential area with narrow roads. Specifically, referring to FIGS. 1 to 4, the lifting device for building a steel structure hoistway comprises: a lifting mechanism 1 and a crane mechanism 2. The lifting mechanism 1 comprises: a bottom platform 11, a middle platform 12 and a top platform 13. The middle platform 12 and the top platform 13 each comprise telescopic brackets 123,131, so as to be supported on the cross beams of the constructed steel structure hoistway. The top platform 13 is connected with the bottom platform 11 through a plurality of columns 41, 42, 43, 44, 45, and the middle platform 12 moves along the plurality of columns as driven by a driving device. The crane mechanism 2 is arranged on the top platform 13 of the lifting mechanism, and comprises a base 20 and a crane on the base, wherein the base 20 is arranged on the top platform 13 and is rotatable relative to the top platform 20 along a vertical axis. The lifting mechanism 1 is configured to ascend and descend in the constructed steel structure hoistway, and the crane mechanism 2 is configured to lift building materials, such as steel beams, steel columns, fasteners, etc., used for construction of the steel structure hoistway, to various positions in the constructed steel structure hoistway, such as the top of the constructed steel structure hoistway, so that the construction crew can continue to build higher levels of the steel structure hoistway. Therefore, the lifting device according to the embodiments of the present invention can be used to conveniently build a steel structure hoistway story by story in a compact environment.

In some embodiments, the plurality of columns 41, 42, 43, 44, 45 comprise at least one screw rod 45 and a plurality of guide columns 41, 42, 43, 44, and the middle platform 12 comprises a nut 122 sleeved on the screw rod 45 and bearings sleeved on the plurality of guide columns, such as the linear bearings 121. The driving device is a first motor 111, which drives the at least one screw rod 45 to rotate through a first transmission device 112, so that depending on the rotation direction of the first motor 111, the middle platform 12 will move along the plurality of columns toward the top platform 13 or the bottom platform 11. In the embodiment shown, the first motor 111 is arranged on the bottom platform 11. Alternatively, the first motor 111 can be arranged on the top platform 13, for example, at the bottom thereof. In an alternative embodiment, at least one screw rod 45 may be fixed, and the first motor 11 may be arranged on the middle platform 12 and drives the nut 122 to rotate. Although in the embodiment shown, the middle platform 12 moves along the plurality of columns by means of a screw rod and nut mechanism, other mechanical mechanisms may also be conceived to drive the middle platform 12 to move, such as a rack and pinion mechanism, a chain mechanism, a belt mechanism, a hydraulic mechanism, and the like.

Figure 5:
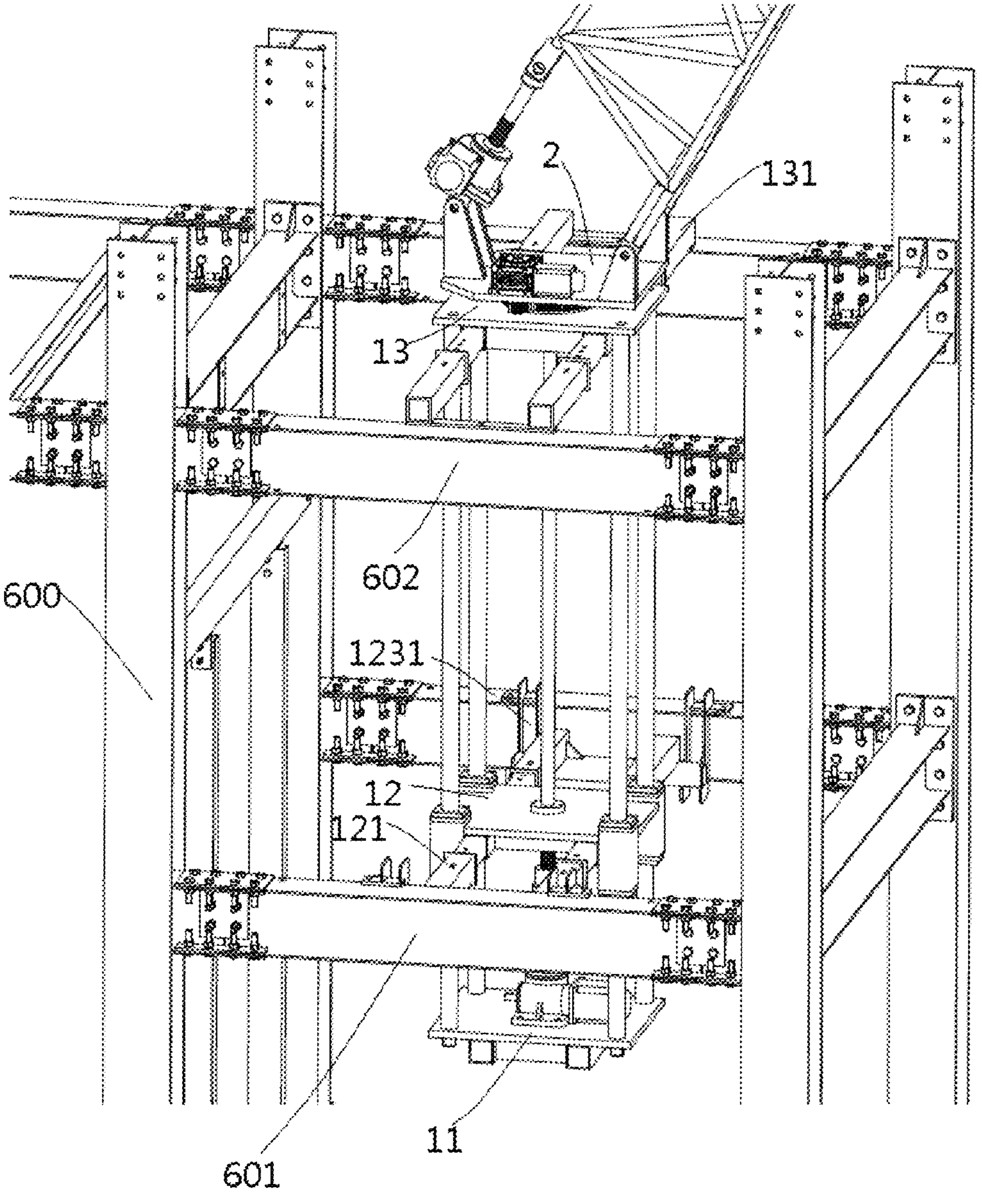
FIG. 5 is a view of a lifting device according to an embodiment supported in a constructed steel structure hoistway.

In some embodiments, the bottom platform 11, the middle platform 12 and the top platform 13 are all substantially rectangular. For example, as shown in FIG. 5, the dimensions (i.e., length and width) of the bottom platform 11, the middle platform 12 and the top platform 13 are configured to be less than ½ of the corresponding dimensions (i.e., length and width) of the steel structure hoistway. The crane mechanism 2, when its crane is in the vertical orientation, is within the top platform 13, that is, the projection of the crane mechanism 2 in the vertical direction does not extend beyond the top platform 13. This enables the lifting device to have a compact structure so that it can freely ascend and descend in the constructed steel structure hoistway. In some embodiments, at least one screw rod 45 is located in the middle of the bottom platform 11, the middle platform 12 and the top platform 13, and four guide columns 41, 42, 43, 44 are located at the four corners of the bottom platform 11, the middle platform 12 and the top platform 13. The middle platform 12 is sleeved on the respective guide columns 41, 42, 43, 44 through linear bearings 121, so that the middle platform 12 keeps its balance and stability during its movement relative to the bottom platform 11 and the top platform 13.

Figure 3:
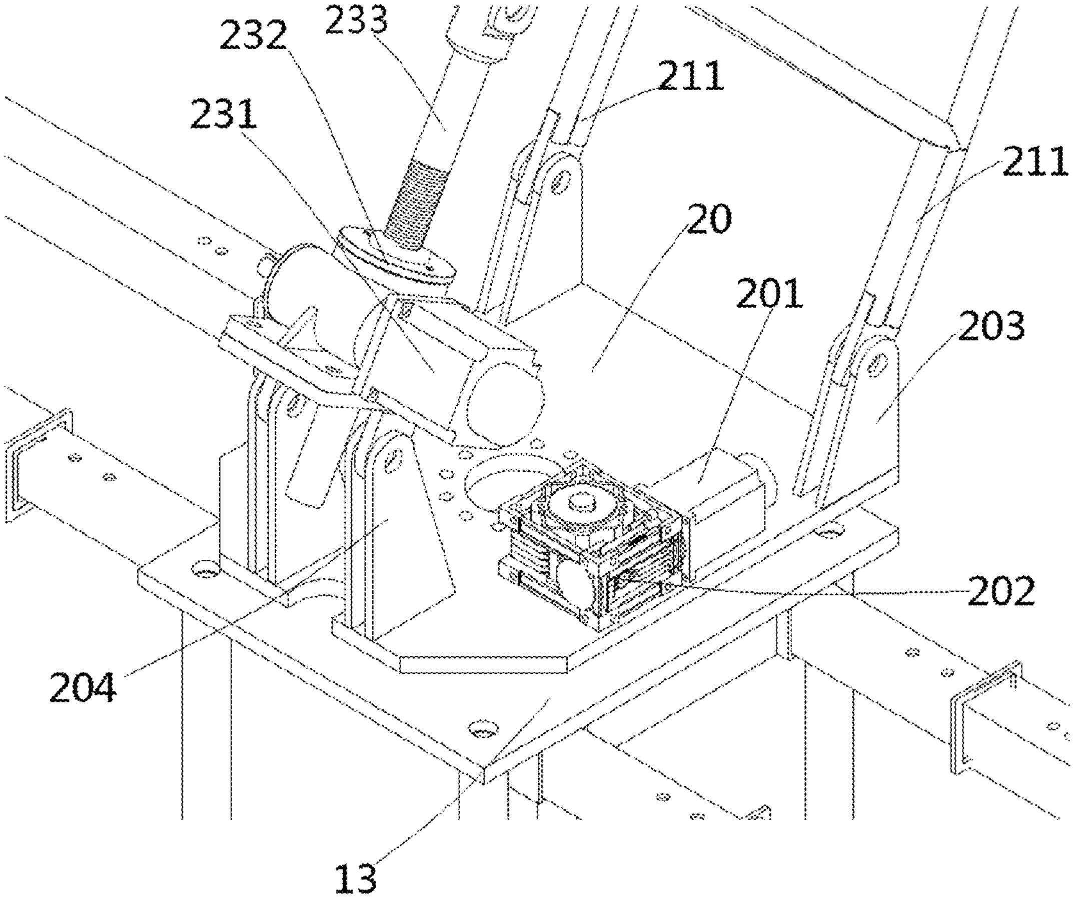
FIG. 3 is an enlarged view of the junction of the lifting mechanism part and the crane mechanism part of the lifting device according to an embodiment.
Figure 4:
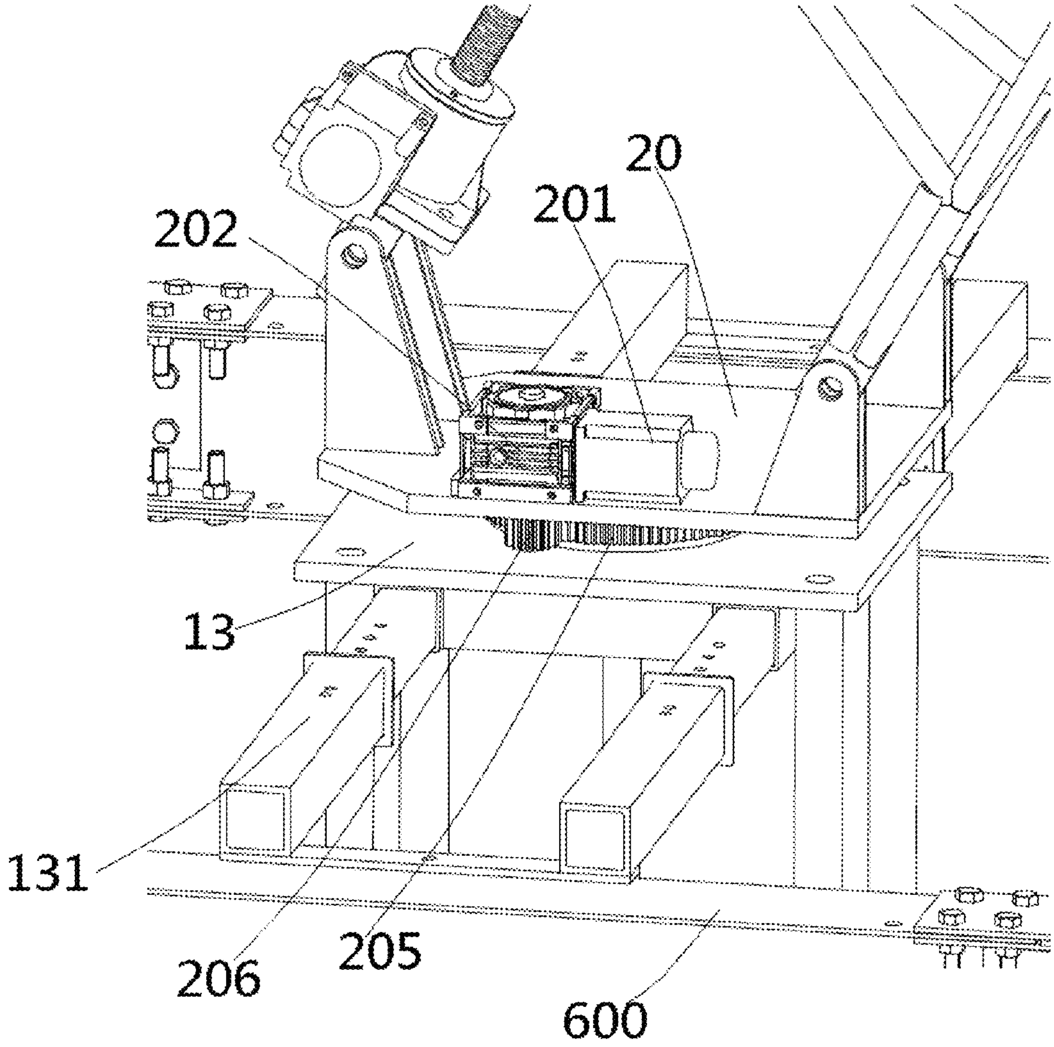
FIG. 4 is a view from another angle of the junction of the lifting device according to an embodiment.

Referring to FIGS. 3 and 4, the base 20 of the crane mechanism 2 is connected to the top surface of the top platform 13 of the lifting mechanism 1 through a rotatory support bearing 205. The base 20 has a second motor 201 on it, which meshes with the external teeth of the rotary support bearing 205 through a second transmission mechanism 202. For example, the second transmission mechanism comprises a worm and gear mechanism 202 and a pinion 206. The pinion 206 meshes with the external teeth of the rotary support bearing 205 on its outside, thereby driving the base 20 of the crane mechanism to rotate relative to the lifting mechanism 1 through the second motor 201, so that the angular position of the crane on the base on the horizontal plane can be adjusted.

Figure 7:
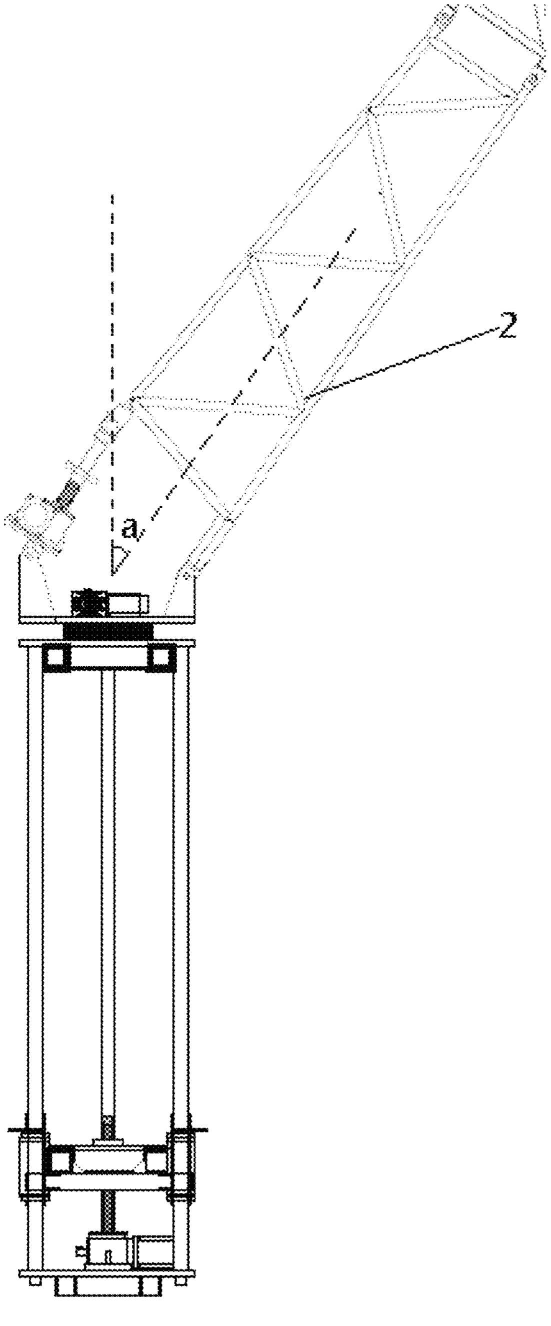
FIG. 7 is a schematic view of the crane of the lifting device according to an embodiment when the crane is inclined.

In some embodiments, the crane comprises a hanger frame, which may for example consist of a plurality of detachable sections 21, 22. The size of each of the sections 21, 22 is configured, for example, to be removable from the steel structure hoistway, so as to facilitate the recovery of the lifting device upon completion of the steel structure hoistway construction. The hanger frame may consist of three longitudinal columns 211, 212 and several transverse columns 213. As shown in FIG. 3, the first side of the hanger frame (formed by two longitudinal columns 211) is pivotally connected to the base, e.g., a first support 203 on the base, and the second side of the hanger frame (formed by another longitudinal column 212) is pivotally connected to the telescopic mechanism that is pivotally connected to the base 20, e.g., a second support 204 on the base. Wherein, the pivot axes of the pivotal connections between the first side of the hanger frame 21 and the base 20, the second side of the hanger frame 21 and the telescopic mechanism and the telescopic mechanism and the base 20 are parallel to each other. The telescopic mechanism can be, for example, a screw rod lifting device, which comprises a third motor 231, a third transmission device, a nut 232 and a telescopic screw rod 233. As shown in FIG. 7, driven by the third motor 231, this arrangement enables the hanger frame to move between a vertical orientation and an inclined orientation at an inclined angle a to the vertical direction. In some embodiments, the inclined angle a is greater than 15 degrees, e.g., in the range of 30 degrees to 45 degrees. In addition, although not shown, the base 20 may also be provided with a windlass, which is provided on the bracket above the second motor 201. Furthermore, for the sake of clarity, devices such as cables and hooks are not shown.

Figure 2:
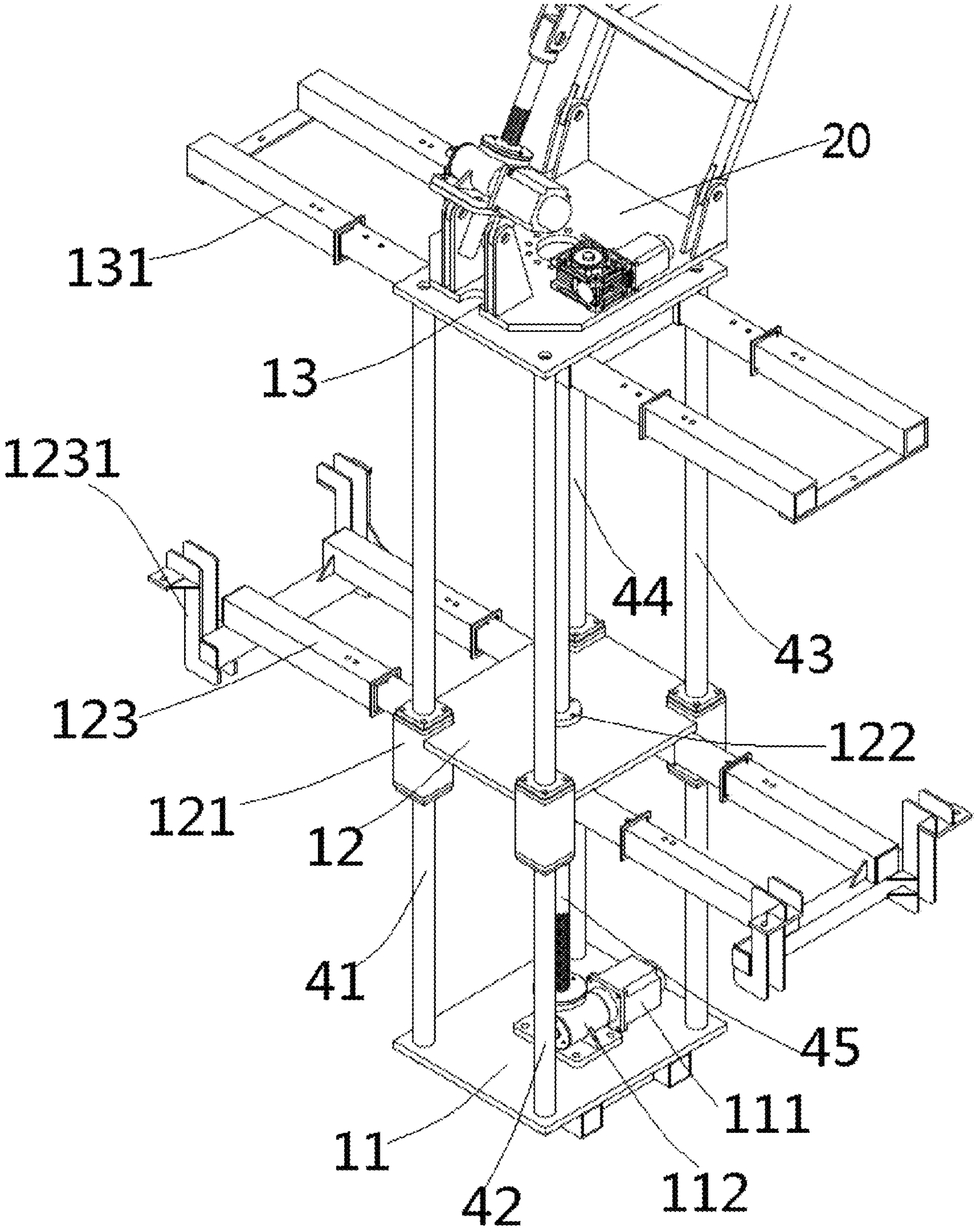
FIG. 2 is an enlarged view of a lifting mechanism part of a lifting device according to an embodiment.
Figure 6:
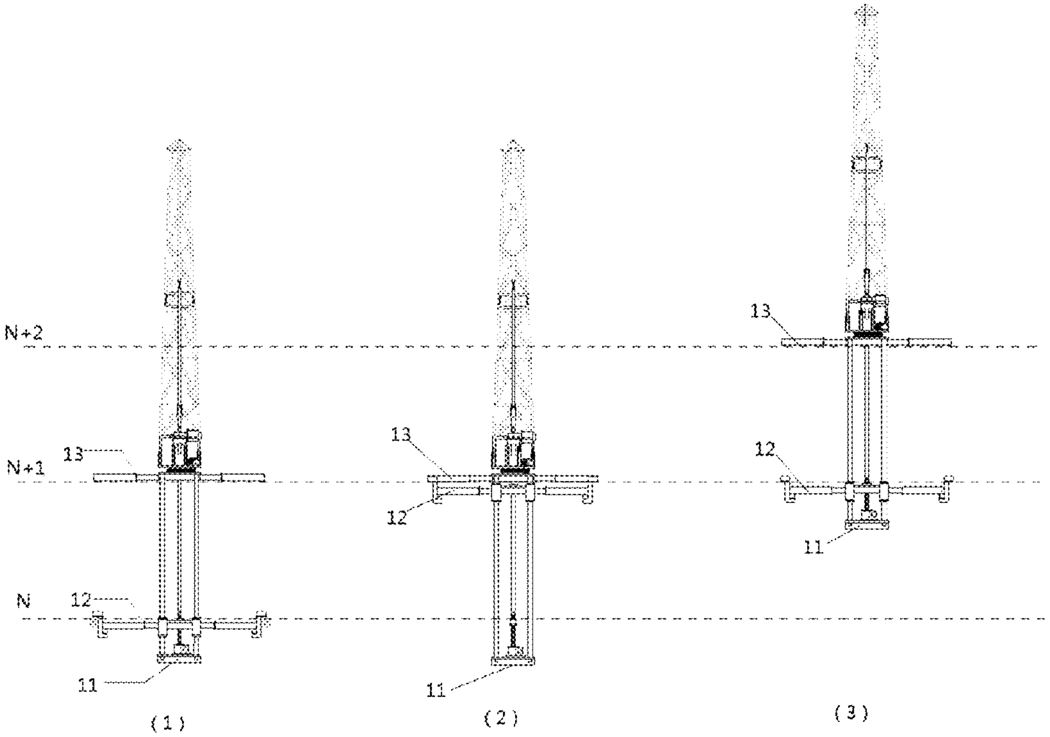
FIG. 6 is a schematic view of the climbing process of a lifting device according to an embodiment.

With continued reference to FIG. 6, in some embodiments, the middle platform 12 can move between a first position close to the top platform 13 (step (2) of FIG. 6) and a second position close to the bottom platform 11 (steps (1) and (3) of FIG. 6). In the first position, the telescopic brackets of the middle platform 12 and the top platform 13 can be supported by the same pair of cross beams, i.e., the cross beams of the N+1$^{th}$ story in step (2) of FIG. 6. For that purpose, as shown in FIG. 2, the ends of the telescopic bracket 131 of the top platform 13 may be in a straight configuration, while the ends of the telescopic bracket 123 of the middle platform 12 may comprise hooks 1231 extending upward. As shown in step (2) of FIG. 6, when supported by the same cross beam, the telescopic bracket 131 of the top platform 13 and the telescopic bracket 123 of the middle platform 12 avoid each other without interference. In the illustrated embodiment, the telescopic bracket 131 of the top platform 13 and the telescopic bracket 123 of the middle platform 12 are telescopic in the same direction. In alternative embodiments, however, the telescopic bracket 131 of the top platform 13 and the telescopic bracket 123 of the middle platform 12 are telescopic in directions perpendicular to each other, i.e. in a “cross” shape when viewed from the top.

According to another aspect of the present invention, a method of building a steel structure hoistway is further provided, which comprises the following steps: building a fundamental steel structure hoistway on ground and placing a lifting device in the steel structure hoistway; bringing the lifting device to climb until the top platform thereof is close to the top of the constructed steel structure hoistway; lifting, using a crane mechanism, building materials, such as steel beams, steel columns (i.e., steel I-beams), and using lifted beams to build higher levels of the steel structure hoistway; and repeating the steps of bringing the lifting device to climb and building higher levels of the steel structure hoistway until a steel structure hoistway of a desired height is constructed.

In some embodiments, as shown in FIG. 6, the method comprises: building the cross beams and longitudinal beams of the N$^{th}$ story, extending the telescopic bracket of the middle platform of the lifting device to be supported by the cross beams of the N$^{th}$ story, and elevating the top platform to the N+1$^{th}$ story; lifting beams for construction of the steel structure hoistway to the N+1$^{th}$ story to build the cross beams and longitudinal beams of the N+1$^{th}$ story; extending the telescopic bracket of the top platform to be supported by the cross beams of the N+1$^{th}$ story (as shown in step (1) of FIG. 6), and retracting the telescopic bracket of the middle platform (as shown in step (2) of FIG. 6); bringing the middle platform to climb until close to the top platform, and extending the telescopic bracket of the middle platform to be supported by the cross beams of the N+1$^{th}$ story; and retracting the telescopic bracket of the top platform, and bringing the top platform to climb up the N+2$^{th}$ story (as shown in step (3) of FIG. 6), where N can be any natural number.

In some embodiments, after a steel structure hoistway of a desired height is constructed, the crane of the crane mechanism is oriented vertically, the lifting device is lowered to ground, the crane is detached, and the lifting device is recovered. In some embodiments, the lifting device is the lifting device described in detail herein. Alternatively, the structure of the lifting device may differ from what is shown. In addition, it is worth noting that the stories for the cross beams in the present application, such as the N$^{th}$ story, the N+1$^{th}$ story and the N+2$^{th}$ story, may not be aligned with the original stories of the building. For example, the story height thereof may be smaller than the original story height of the building, e.g., it can be between 2 and 3 meters. In addition, the length of the hanger frame can be less than the height of two stories, for example, around 4 meters, so that the detachable sections 21, 22 of the hanger frame are around 2 meters long.

The specific embodiments of the present application described above are merely intended to describe the principles of the present application more clearly, wherein various components are clearly shown or described to facilitate the understanding of the principles of the present invention. Those skilled in the art may, without departing from the scope of the present application, make various modifications or changes to the present application. Therefore, it should be understood that these modifications or changes should be included within the scope of patent protection of the present application.

What is claimed is:

1. A lifting device for building a steel structure hoistway, comprising:

a lifting mechanism comprising a bottom platform, a middle platform and a top platform, wherein the middle platform and the top platform each comprise telescopic brackets so as to be supported on cross beams of the steel structure hoistway built, the top platform is connected with the bottom platform through a plurality of columns, and the middle platform moves along the plurality of columns as driven by a driving device; and a crane mechanism arranged on the top platform of the lifting mechanism and comprising a base and a crane on the base, wherein the base is arranged on the top platform and is rotatable relative to the top platform along a vertical axis, and a hanger frame of the crane is movable between a vertical orientation and an inclined orientation;

wherein the lifting mechanism is configured to ascend and descend in the steel structure hoistway built, and the crane mechanism is configured to lift building materials for use in building the steel structure hoistway;

wherein the plurality of columns comprises at least one screw rod and a plurality of guide columns, and the middle platform comprises a nut sleeved on the at least one screw rod and a bearing sleeved on at least one of the plurality of guide columns.

2. The lifting device according to claim 1, wherein the middle platform is movable between a first position close to the top platform and a second position close to the bottom platform, and in the first position, the telescopic brackets of the middle platform and the top platform are capable of being supported by the same pair of cross beams.

3. The lifting device according to claim 2, wherein ends of the telescopic bracket of the middle platform have hooks extending upward, and ends of the telescopic bracket of the top platform have a straight configuration.

4. The lifting device according to claim 1, wherein the driving device comprises a first motor and a first transmission mechanism, the first motor drives the at least one screw rod to rotate through the first transmission mechanism.

5. The lifting device according to claim 4, wherein the first motor is arranged on the bottom platform or the top platform.

6. The lifting device according to claim 1, wherein the bottom platform, the middle platform and the top platform are all substantially rectangular, the at least one screw rod is located in the middle of the bottom platform, the middle platform and the top platform.

7. The lifting device according to claim 1, wherein the base of the crane mechanism is connected to a top surface of the top platform of the lifting mechanism through a rotatory support bearing, the base is provided with a second motor that meshes with an external teeth of the rotatory support bearing through a second transmission mechanism, so as to drive the base of the crane mechanism to rotate through the second motor.

8. The lifting device according to claim 7, wherein a windlass is further provided on the base, and the windlass is arranged on a platform above the second motor.

9. The lifting device according to claim 7, wherein the second transmission mechanism comprises a worm and gear mechanism and a pinion.

10. The lifting device according to claim 1, wherein a first side of the hanger frame is pivotally connected to a first support on the base, and a second side of the hanger frame is pivotally connected to a telescopic mechanism pivotally connected to a second support on the base, so that the hanger frame is movable between a vertical orientation and an inclined orientation at an inclined angle a of more than 15 degrees from the vertical direction.

11. The lifting device according to claim 10, wherein the telescopic mechanism is a screw rod lifting device.

12. A method of building a steel structure hoistway, comprising:

building a fundamental steel structure hoistway on ground and placing a lifting device of claim 1 in the steel structure hoistway;

bringing a top platform of the lifting device close to top of a steel structure hoistway built;

lifting, using a crane mechanism, building materials, and using lifted building materials to build higher levels of the steel structure hoistway; and repeating steps of having the lifting device to climb, lifting building materials using the crane mechanism, and building a higher levels of the steel structure hoistway until a steel structure hoistway of a desired height is constructed.

13. The method according to claim 12, comprising:

extending telescopic brackets of a middle platform of the lifting device to be supported by cross beams of the $N^{th}$ story, and elevating the top platform to the $N+1^{th}$ story;

lifting beams for construction of the steel structure hoistway to the $N+1^{th}$ story to build cross beams and longitudinal beams of the $N+1^{th}$ story;

extending telescopic brackets of the top platform to be supported by cross beams of the N+1 story, and retracting the telescopic brackets of the middle platform;

having the middle platform to climb until close to the top platform, and extending the telescopic brackets of the middle platform to be supported by the cross beams of the $N+1^{th}$ story; and retracting the telescopic brackets of the top platform, and bringing the top platform to climb to the $N+2^{th}$ story.

14. The method according to claim 12, further comprising: orienting a crane of the crane mechanism vertically, lowering the lifting device to ground, detaching the crane and recovering the lifting device, after a steel structure hoistway of a desired height is constructed.

15. The lifting device according to claim 1, wherein the plurality columns comprise four columns located at four corners of the bottom platform, the middle platform and the top platform.

16. The lifting device according to claim 1, wherein the bearing comprises a linear bearing.

* * * * *